Patented Feb. 10, 1953

2,628,186

UNITED STATES PATENT OFFICE 2,628,186

CARBOXYLIC ION EXCHANGE RESIN PURIFICATION OF VITAMIN $B_{12}$

William Shive, Austin, Tex., assignor to Research Corporation, New York, N. Y., a corporation of New York No Drawing. Application January 4, 1950, Serial No. 136,847

7 Claims. (Cl. 167—81)

This invention relates to vitamin $B_{12}$, and more particularly to the purification thereof.

Vitamin $B_{12}$ is the term applied to a factor capable of alleviating or eliminating the symptoms associated with Addisonian pernicious anemia. In purified state, vitamin $B_{12}$ is a crystalline compound. It is characterized by the presence in its molecule of about 4 percent cobalt. In aqueous solution in visible light it shows an absorption band at about 550 m$\mu$, and in ultraviolet light it shows absorption bands at about 361 and about 278 m$\mu$.

In its several sources, vitamin $B_{12}$ occurs in very low concentration and appears to occur in association with chemically similar impurities so that its isolation and provision in crystalline form is difficult of attainment. For this reason and also because of its extremely high potency, vitamin $B_{12}$ has usually been administered not as a pure crystalline material, but rather as a concentrate, i. e. a material containing a variable amount of vitamin $B_{12}$, the amount ranging upwards of about 0.01 percent by weight.

An object of this invention is to provide a simple, expeditious process of purifying vitamin $B_{12}$. Another object is to provide a simple process of preparing a vitamin $B_{12}$ concentrate suitable for therapeutic use. Other objects will become apparent from the following description of this invention.

In pursuance of the above and other objects, by this invention there is provided a simple, efficient process of purifying vitamin $B_{12}$ which comprises the contacting of a solution of vitamin $B_{12}$ and associated impurities with a synthetic ion-exchange resin, to cause the selective fixation of the vitamin $B_{12}$ on the resin, and subsequently recovering the vitamin $B_{12}$ in substantially purer condition from the ion-exchange resin. As is disclosed hereinafter, the fixation and subsequent removal of the vitamin $B_{12}$ are carried out within controlled ranges of pH so that the fixation and removal are effected preferentially to the fixation and removal of impurities also present in the vitamin $B_{12}$ solution. If desired, the ion-exchange material may be used to serve the dual purpose of first fixing and removing impurities associated with the vitamin $B_{12}$ and subsequently fixing and purifying the vitamin $B_{12}$. This dual application of the ion-exchange resin is carried out by two passages of the vitamin $B_{12}$ solution over the ion-exchange resin, the first passage being at a pH suitable for preferential fixation of impurities and the second passage at a pH suitable for selective fixation of the vitamin $B_{12}$.

The aqueous vitamin $B_{12}$ solution used as a starting material in the process of this invention can be derived from many different sources. For example, the ordinary commercial liver extracts which are available on the market for parenteral administration and which contain vitamin $B_{12}$ in relatively large concentrations, are well adapted to employment in this process. On the other hand, extremely crude liver extracts such as are obtained by simple aqueous extraction of ground liver and which contain but relatively small quantities of vitamin $B_{12}$, are likewise readily adaptable to this process. Furthermore, mold-growth culture media in which an amount of vitamin $B_{12}$ has been produced by the growth of the microorganisms are amenable to the process of this invention, and the vitamin $B_{12}$ contained therein is readily isolated and freed from associated impurities.

For illustrative purposes, there is given below a preferred method of carrying out the dual use of the ion-exchange resin in accordance with the process of this invention, to provide a vitamin $B_{12}$ preparation suitable for therapeutic application.

A carboxylic ion-exchange resin suitably arranged for contacting with a vitamin $B_{12}$-containing solution, as for example, in the form of a column, is adjusted to about pH 8.5 by passing over the column a solution of aqueous alkaline material, for example dilute aqueous pyridine or an alkaline phosphate buffer. The column is washed with water to remove the excess pyridine or buffer. Over the column is then passed a solution of vitamin $B_{12}$, for example, a solution containing about 20 U. S. P. units of antipernicious anemia factor per ml., diluted with several times its volume of water. The solution which passes through the column and which contains the vitamin $B_{12}$ is saved. The column to which are fixed some of the impurities originally present in the vitamin $B_{12}$ solution is simultaneously freed from those impurities and conditioned for the fixation of the vitamin $B_{12}$ on the column by passing over the column a solution of an acid buffer or a diluted acid, such as dilute acetic acid, to bring the ion-exchange resin to about pH 5. The column is then thoroughly washed with water to insure substantially complete removal from the column of the impurities fixed thereon. The vitamin $B_{12}$ solution recovered after its initial passage through the column is adjusted to about pH 5, and is again passed over the column. During this second passage, the vitamin $B_{12}$ in the solution is fixed to the ion-exchange resin and thus freed from many of the impurities still remaining in the solution, these latter passing through the column. The column preferably is washed to remove all substances not fixed to the ion-exchange resin and the vitamin $B_{12}$ is recovered from the resin by elution. The elution is carried out by passing over the column a 0.1 N aqueous hydrochloric acid solution containing about 50 percent by volume of acetone. The eluate can be evaporated in vacuo, or frozen and dried while in the frozen state to obtain the dry vitamin $B_{12}$ or, if desired, can be subjected to further purification procedures such as adsorption on alumina or silica gel and the like. By carrying out the procedure described above, the hemapoietic potency of crude vitamin $B_{12}$ can be increased upwards of 100-fold.

It is important in obtaining optimum results that the ion-exchange resin be carefully conditioned to the proper pH value and the pH of the solution of the vitamin $B_{12}$ be properly adjusted. Without proper conditioning or pH control, the selective fixation and removal of the vitamin $B_{12}$ will not be secured. Generally speaking, with solutions containing relatively large amounts of impurities and only small amounts of vitamin $B_{12}$, the most efficient fixation of the vitamin $B_{12}$ is obtained by having the vitamin $B_{12}$ solution and the ion-exchange resin at a pH value between pH 3 and pH 6. Relatively pure solutions of vitamin $B_{12}$ appear to be less dependent upon the pH, and with such solutions, fixation of the vitamin $B_{12}$ can occur even with the ion-exchange resin at neutral pH.

For the adjustment of the pH of the resin and the vitamin $B_{12}$ aqueous solution, any of the customarily employed acids or bases with or without the addition of buffers can be used. Suitable acids include acetic acid, hydrochloric acid, sulfuric acid and the like, and suitable bases include sodium hydroxide, potassium hydroxide and amines such as pyridine and tributylamine. Suitable buffers include the phosphate and acetate buffers, and other similar buffers.

For elution of the vitamin $B_{12}$ from the ion-exchange resin, acid or alkaline, e. g. nonneutral, solutions are used. For efficient removal of the vitamin $B_{12}$ it is desirable that the acid or alkaline solution contain a water-miscible, polar organic solvent. Many such solvents are known, the most readily available being the lower alcohols and ketones. When alkaline solutions are employed for elution, the alkali selected may be such as will serve both as the organic solvent and the alkaline material. For example, aqueous solutions of pyridine, tributylamine, picoline and the like, are capable of acting in the capacity of both the organic solvent and the base. When inorganic acids or bases are used for producing the acid or alkaline solutions required for the elution, the organic solvents employed are water-miscible polar solvents such as acetone, the lower alcohols, glycols and the like. These, when used with an aqueous acid such as hydrochloric acid, sulfuric acid, or an aqueous alkali such as sodium hydroxide, calcium hydroxide and the like, provide efficient elution of the vitamin $B_{12}$. Although relatively strong alkali or acid solutions may be employed for the elution, it is preferable that the concentrations are not substantially in excess of 0.1 N lest the vitamin $B_{12}$ be destroyed. For example, when a mineral acid is used in the eluting solvent the concentration employed preferably is between 0.05 N and 0.1 N. Furthermore, as an added precaution, it is recommended that the process described herein, as well as any previous or subsequent steps which may be employed, be carried out away from direct sunlight, inasmuch as vitamin $B_{12}$ has a pronounced light lability, this being especially noticeable when the vitamin $B_{12}$ is relatively impure.

The ion-exchange resins suitable for use in the process of this invention are those known to the art as carboxylic ion-exchange resins. This invention is illustrated and exemplified with particular reference to that ion-exchange resin sold by Rohm and Haas, of Philadelphia, Pennsylvania, under the trade-mark "IRC-50" but it will be understood that this invention is not limited to the use of this particular resin but is fully effective with other carboxylic ion-exchange resins.

This invention is further illustrated by the following specific examples which typify the presently preferred methods of carrying out this invention.

Example 1

5 g. of ion-exchange resin sold under the trade name "Amberlite IRC-50" are placed in a small glass column and the pH of the resin is adjusted by passing 50 ml. of 3 percent aqueous acetic acid over the column. The column is washed with water until free from acid. The column is then treated with a vitamin $B_{12}$-containing solution obtained by diluting 10 ml. of a commercial liver extract preparation containing about 20 U. S. P. units of antipernicious anemia factor per ml. to a total volume of about 50 ml., and adjusting the pH of the solution to pH 3 with dilute hydrochloric acid. After the vitamin $B_{12}$ solution has passed through the column, the column is washed with about 50 ml. of water to remove impurities which have not been fixed on the column. The vitamin $B_{12}$ is removed from the column by treating the resin with about 20 ml. of a 3 percent solution of pyridine in water. The vitamin $B_{12}$ is recovered from the pyridine solution by evaporation of the solution in vacuo. Vitamin $B_{12}$ thus obtained and as determined by microbiological tests had an activity of about 2,500 $\gamma$ (i. e., 2.5 mg.) of vitamin $B_{12}$ per gram of solids as compared with an activity of about 50 $\gamma$ per gram of solids possessed by the solids in the original starting material.

Example 2

A glass column 6 feet high and 2 feet in diameter is filled with "Amberlite IRC-50." The resin is adjusted to about pH 5 by recycling through the column acetic acid-sodium acetate buffer. The column is then washed with water. There are then passed over the column 3000 gallons of spent streptomycin broth, i. e. the *Streptomyces griseus* mold-growth culture medium from which the mold mycelium and streptomycin have been removed. The spent broth contains approximately 0.7 $\gamma$ of $B_{12}$ per ml. of solution. Prior to passage over the column the broth is adjusted to pH 5 and during its passage over the column the flow rate is adjusted to approximately 3 gallons per minute. The column is then washed with 275 gallons of 0.1 N hydrochloric acid. The vitamin $B_{12}$ fixed on the resin is removed by recycling through the column 100 gallons of 60 percent aqueous acetone solution which is 0.1 N in sulfuric acid. The recycling is continued for one hour. The eluate is then removed and a second elution is made by recycling through the column 25 gallons of a similar aqueous acetone-sulfuric acid mixture. The combined eluates are freed from sulfuric acid by precipitation of the acid with barium hydroxide and filtration of the insoluble barium sulfate.

The aqueous acetone solution obtained in accordance with the above procedure possesses an activity of about 5000 γ (i. e., 5 mg.) of vitamin $B_{12}$ per gram of solids in comparison with the value of 30 γ per gram of solids possessed by the material in the crude spent broth. If desired, the vitamin $B_{12}$ can be recovered in solid form by evaporating the aqueous acetone solution in vacuo, but since the vitamin $B_{12}$ thus obtained from a streptomycin broth is contaminated with an amount of actidione, it is preferable to subject the aqueous acetone solution to further treatment as follows:

The aqueous acetone solution is saturated with ammonium sulfate and the supernatant acetone layer is separated. This acetone layer contains a sufficient amount of water to retain the vitamin $B_{12}$ in solution. The vitamin $B_{12}$ is precipitated by adding to the aqueous acetone a sufficient amount of absolute acetone to reduce the water content to less than about 5 percent by volume. The precipitate of vitamin $B_{12}$ is separated by decantation or filtration and the solid is extracted with 95 percent ethanol. The alcoholic extract containing the vitamin $B_{12}$ is filtered to remove insoluble matter and is evaporated to dryness in vacuo. The vitamin $B_{12}$ thus obtained has a potency of about 30,000 γ per gram of solid and is entirely suitable for therapeutic use.

Alternatively, the vitamin $B_{12}$ thus obtained can be subjected to crystallization from suitable solvents for the preparation of pure, crystalline vitamin $B_{12}$.

Instead of using the salting out procedure described above, the vitamin $B_{12}$ can be recovered by evaporating the aqueous acetone solution in vacuo to a small volume and adding to the resulting substantially aqueous solution an amount of acetone to reduce the water content of the mixture to less than about 5 percent. The precipitated vitamin $B_{12}$ is separated by filtration and dried.

Example 3

5 g. of "Amberlite IRC-50" is placed in a small glass column and the resin is adjusted to about pH 8.5 by passing over the column a dilute aqueous pyridine solution. The column is then treated with a vitamin $B_{12}$-containing solution obtained by diluting 10 ml. of a commercial liver extract preparation containing about 20 units of antipernicious anemia factor per ml. to a total volume of about 50 ml., and adjusting the solution to about pH 8.5 with alkaline phosphate buffer. The solution passing through the column contains the vitamin $B_{12}$ and is saved.

The column is then treated with about 200 ml. of 3 percent aqueous acetic acid to adjust the resin to about pH 5 and the column is washed well with water to complete the removal of the impurities which had been fixed on the resin at the higher pH. The solution obtained in the original passage of the resin preparation through the column is adjusted to pH 5 and is again passed over the column. The column is then washed with about 50 ml. of water to remove impurities not fixed on the column and the vitamin $B_{12}$ is removed from the column by treating the resin with about 20 ml. of a 3 percent solution of pyridine in water. The vitamin $B_{12}$ is recovered from the pyridine solution by evaporation of the solution in vacuo.

Example 4

200 ml. of streptomycin fermentation broth from which the streptomycin has been removed is adjusted to about pH 4 and passed over a column of 150 ml. of "Amberlite IRC-50" resin previously adjusted to pH 4. 200 ml. of acid-sodium acetate buffer having a pH 4 is then passed over the resin. The vitamin $B_{12}$ in the resin is eluted by passing over the resin 100 ml. of 5 percent aqueous pyridine solution followed by 50 ml. of distilled water. The eluates are combined and the vitamin $B_{12}$ contained therein is recovered by evaporation in vacuo.

The dry residue is freed from actidione in a minimum amount of water, filtering the solution and adding a larger excess of acetone to precipitate the vitamin $B_{12}$. The vitamin $B_{12}$ is recovered by filtration or decantation and dried in vacuo.

I claim:

1. A process of purifying vitamin $B_{12}$ in an impure aqueous vitamin $B_{12}$-containing solution, which comprises contacting the vitamin $B_{12}$ solution with a carboxylic ion-exchange resin with both said resin and said vitamin $B_{12}$ solution adjusted to between about pH 3 and pH 6 to cause fixation of the vitamin $B_{12}$ on the said resin, washing the said resin with dilute aqueous acid to cause substantial removal of the impurities associated with the vitamin $B_{12}$, and removing the vitamin $B_{12}$ from the said resin by passing over the resin an aqueous acid mixture consisting of water-miscible polar organic solvent and a mineral acid in a concentration between about 0.05 and 0.1 N.

2. The process of purifying vitamin $B_{12}$ which comprises contacting an impure aqueous solution of vitamin $B_{12}$ with a carboxylic ion-exchange resin with the said resin adjusted to about pH 5, washing the resin and vitamin $B_{12}$ affixed thereon with dilute aqueous mineral acid, and removing the vitamin $B_{12}$ from the resin by contacting the resin with an aqueous mixture composed of acetone, water and dilute hydrochloric acid in a concentration of from about 0.05 to about 0.1 N.

3. The process of purifying vitamin $B_{12}$ which comprises contacting an impure aqueous solution of vitamin $B_{12}$ at a pH between about pH 3 and about pH 6 with a carboxylic ion-exchange resin adjusted to a pH between about pH 3 and about pH 6 and eluting the vitamin $B_{12}$ from said resin by contacting said resin with a nonneutral aqueous solution of a water-miscible, polar organic solvent.

4. The process of purifying vitamin $B_{12}$ which comprises contacting an impure aqueous solution of vitamin $B_{12}$ at a pH between pH 3 and pH 6 with a carboxylic ion-exchange resin adjusted to a pH between pH 3 and pH 6, and eluting and recovering the vitamin $B_{12}$ fixed on said resin by treating said resin with an acidic aqueous solution of a water-miscible, polar, organic solvent, said solution containing acid in a concentration up to about 0.1 N.

5. The process of purifying vitamin $B_{12}$ which comprises contacting an impure aqueous solution of vitamin $B_{12}$ at a pH between pH 3 and pH 6 with a carboxylic ion-exchange resin adjusted to a pH between pH 3 and pH 6, and eluting and recovering the vitamin $B_{12}$ fixed on said resin by treating said resin with an alkaline aqueous solution of a water-miscible, polar, organic solvent, said solution containing alkali in a concentration up to about 0.1 N.

6. The process of purifying vitamin $B_{12}$ which comprises contacting an impure aqueous solution of vitamin $B_{12}$ at a pH between pH 3 and pH 6 with a carboxylic ion-exchange resin adjusted to a pH between pH 3 and pH 6, and eluting and recovering the vitamin $B_{12}$ fixed on said resin by treating said resin with an aqueous solution of pyridine.

7. A process according to claim 6 in which the pyridine solution is a three percent solution of pyridine in water.

WILLIAM SHIVE.

REFERENCES CITED

The following references are of record in the file of this patent:

UNITED STATES PATENTS

| Number | Name | Date |
|---|---|---|
| 2,443,485 | Waksman | June 15, 1948 |
| 2,563,794 | Rickes | Aug. 7, 1951 |
| 2,582,589 | Fricke | Jan. 15, 1952 |

OTHER REFERENCES

Amber-hi-Lites, published by Rohm and Haas, Number 3, August 1949, first page.

Amberlite Ion Exchange Resins, Amberlite IRC-50, pages 1, 8, 9 (April 1948).

Smith: Nature, volume 161, April 24, 1948, pages 638, 639.